US012735564B2

(12) United States Patent
Ko et al.

(10) Patent No.: US 12,735,564 B2
(45) Date of Patent: Sep. 15, 2026

(54) THERMOPLASTIC RESIN COMPOSITION, AND MOLDED ARTICLE

(71) Applicant: LG CHEM, LTD., Seoul (KR)

(72) Inventors: Gun Ko, Daejeon (KR); Seonho Kong, Daejeon (KR); Sun Mo Son, Daejeon (KR)

(73) Assignee: LG Chem, Ltd., Seoul (KR)

( * ) Notice: Subject to any disclaimer, the term of this patent is extended or adjusted under 35 U.S.C. 154(b) by 517 days.

(21) Appl. No.: 18/286,748

(22) PCT Filed: Jan. 2, 2023

(86) PCT No.: PCT/KR2023/000004

§ 371 (c)(1), (2) Date: Oct. 12, 2023

(87) PCT Pub. No.: WO2023/153641

PCT Pub. Date: Aug. 17, 2023

(65) Prior Publication Data

US 2024/0199873 A1 Jun. 20, 2024

(30) Foreign Application Priority Data

Feb. 10, 2022 (KR) ........................ 10-2022-0017482
Dec. 29, 2022 (KR) ........................ 10-2022-0188095

(51) Int. Cl.
*C08L 67/02* (2006.01)
*C08J 3/00* (2006.01)

(52) U.S. Cl.
CPC ............... *C08L 67/02* (2013.01); *C08J 3/005* (2013.01); *C08J 2367/02* (2013.01); *C08J 2425/08* (2013.01); *C08J 2433/08* (2013.01); *C08J 2447/00* (2013.01); *C08J 2451/00* (2013.01); *C08J 2467/02* (2013.01); *C08J 2477/06* (2013.01); *C08L 2205/025* (2013.01); *C08L 2205/035* (2013.01)

(58) Field of Classification Search
CPC ........ C08L 51/003; C08L 51/04; C08L 25/12; C08L 25/16; C08L 79/08; C08L 33/24
See application file for complete search history.

(56) References Cited

U.S. PATENT DOCUMENTS

2014/0322487 A1* 10/2014 Choi ....................... B32B 15/08 428/141
2023/0133698 A1* 5/2023 Kim ....................... C08L 25/12 524/504

FOREIGN PATENT DOCUMENTS

| | | | |
|---|---|---|---|
| CN | 1887959 | A | 1/2007 |
| CN | 101910289 | A | 12/2010 |
| CN | 112745630 | A | 5/2021 |
| CN | 113166510 | A | 7/2021 |
| JP | 2010150534 | * | 7/2010 |
| KR | 10-0624197 | B1 | 9/2006 |
| KR | 10-2008-0007703 | A | 1/2008 |
| KR | 1020080041363 | A | 5/2008 |
| KR | 10-1072120 | B1 | 10/2011 |
| KR | 10-2012-0065330 | A | 6/2012 |
| KR | 1020130073002 | A | 7/2013 |
| KR | 10-2013-0118427 | A | 10/2013 |
| KR | 1020150107459 | A | 9/2015 |
| KR | 10-2019-0054102 | A | 5/2019 |
| KR | 1020200011182 | A | 2/2020 |
| KR | 2022-0012639 | * | 2/2022 |
| KR | 1020220012639 | A | 2/2022 |
| WO | WO2021201508 | * | 10/2021 |

OTHER PUBLICATIONS

Translation of KR 2022-0012639 (Year: 2022).*
Translation of JP2010150534 (Year: 2010).*

* cited by examiner

*Primary Examiner* — Robert C Boyle
(74) *Attorney, Agent, or Firm* — Bryan Cave Leighton Paisner LLP

(57) ABSTRACT

The present disclosure relates to a thermoplastic resin composition and a molded article manufactured using the same. The present disclosure has an effect of providing a thermoplastic resin composition having tensile strength and flexural modulus equal or superior to those of a conventional polyester composite material; having greatly improved impact strength, flexural strength, and heat deflection temperature under high load; and thus being suitable for lightweight automotive parts requiring high rigidity, and a molded article manufactured using the thermoplastic resin composition.

15 Claims, 2 Drawing Sheets

[FIG. 1]
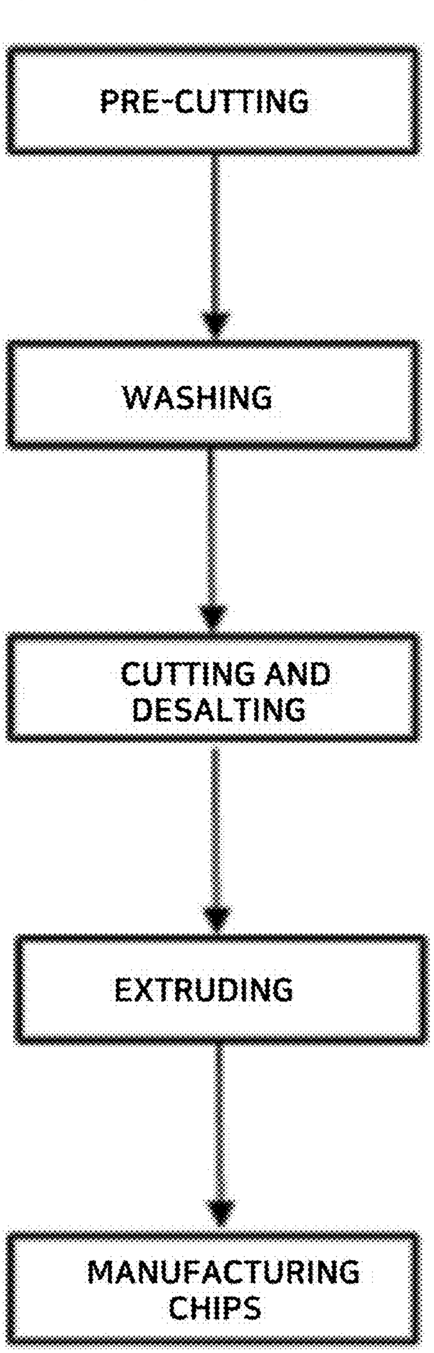

[FIG. 2]
(a)
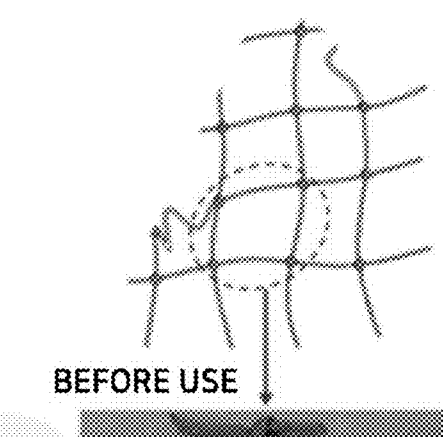
BEFORE USE
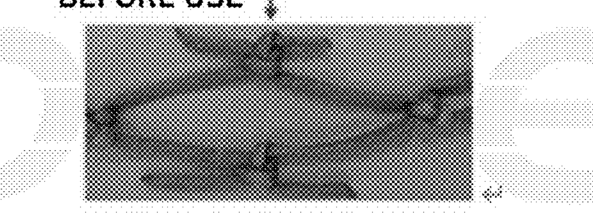
(b)
AFTER USE
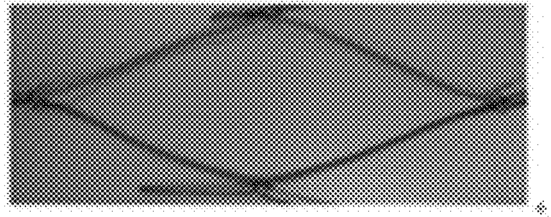
(C)
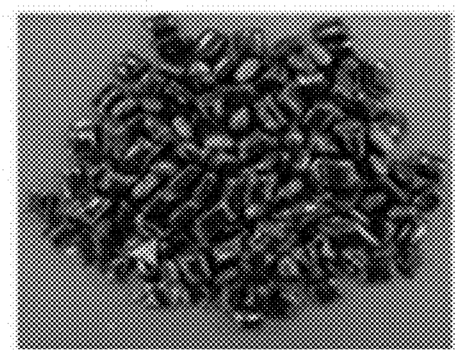

THERMOPLASTIC RESIN COMPOSITION, AND MOLDED ARTICLE

CROSS-REFERENCE TO RELATED APPLICATIONS

The present application is a National Phase entry pursuant to 35 U.S.C. § 371 of International Application No. PCT/KR2023/000004, filed on Jan. 2, 2023, and claims the benefit of and priority to Korean Patent Application No. 10-2022-0017482, filed on Feb. 10, 2022 and Korean Patent Application No. 10-2022-0188095, filed Dec. 29, 2022 with the Korean Intellectual Property Office, the disclosures of which are incorporated herein by reference in their entirety for all purposes as if fully set forth herein.

TECHNICAL FIELD

The present disclosure relates to a thermoplastic resin composition and a molded article manufactured using the same. More particularly, the present disclosure relates to a thermoplastic resin composition having tensile strength and flexural modulus equal or superior to those of a conventional composite material composed of a polyester resin and a reinforcing resin; having greatly improved impact strength, flexural strength, and heat deflection temperature under high load; and thus being suitable for lightweight automotive parts requiring high rigidity, and a molded article manufactured using the thermoplastic resin composition.

BACKGROUND

Research is being actively conducted to use a composite material prepared by alloying a polyester resin and a reinforcing resin for reinforcing rigidity, such as impact strength, and coating performance as a material for automotive parts.

Examples of the reinforcing resin include an acrylate-styrene-acrylonitrile graft copolymer and a styrene-acrylonitrile copolymer, which have excellent mechanical strength, moldability, and long-term properties, and a monomer-styrene-acrylonitrile copolymer having heat resistance.

On the other hand, technologies for obtaining a polyester resin by recycling waste fishing nets are being developed. For example, in the case of tuna fishing, extra-large fishing nets are used to catch skipjack and yellowfin tuna, and the amount of waste fishing nets thrown into the sea every year is estimated to be about 640,000 tons.

An extra-large fishing net for tuna fishing has a length of 2 km and a width of 80 m, weighs about 60 tons, and is usually made of nylon and polyethylene terephthalate.

Therefore, when the above-mentioned composite material is prepared using large waste fishing nets and high heat resistance, high rigidity, high coating performance, and weight reduction are realized, an eco-friendly composite material capable of preventing environmental pollution may be provided.

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

SUMMARY

Technical Problem

Therefore, the present disclosure has been made in view of the above problems, and it is one object of the present disclosure to provide a thermoplastic resin composition having tensile strength and flexural modulus equal or superior to those of a conventional polyester composite material; having greatly improved impact strength, flexural strength, and heat deflection temperature under high load; and thus being suitable for lightweight automotive parts requiring high heat resistance and high rigidity, and a molded article manufactured using the thermoplastic resin composition.

The above and other objects can be accomplished by the present disclosure described below.

Technical Solution

In accordance with one aspect of the present disclosure, provided is a thermoplastic resin composition, including:

12.7 to 20% by weight of a polyester resin; 1 to 12% by weight of a recycled resin or a polyamide/polyalkylene terephthalate alloy resin; greater than 15% by weight and 18% by weight or less of a conjugated diene-aromatic vinyl compound-vinyl cyanide compound graft copolymer; greater than 15% by weight and 22% by weight or less of a conjugated diene-aromatic vinyl compound-vinyl cyanide compound bulk copolymer; 27 to 45% by weight of a copolymer composed of an acrylate-based compound-alkyl-substituted aromatic vinyl compound-vinyl cyanide compound; and 8 to 12.5% by weight of a maleimide-based polymer.

The recycled resin may be a resin obtained by processing waste fishing nets.

The resin obtained by processing waste fishing nets may include 60 to 99.9% by weight in total of Ca, Fe, and S, and 0.1 to 40% by weight in total of Na, Mg, Al, Si, K, Ti, Ni, Zn, Sb, and Cl, based on 100% by weight of total inorganic components as measured using Inductively Coupled Plasma Optical Emission spectroscopy (ICP-OES) equipment.

The resin obtained by processing waste fishing nets may be a desalted recycled resin.

The polyester resin may be polybutylene terephthalate having an intrinsic viscosity (IV) of 1.0 dl/g or more.

The conjugated diene-aromatic vinyl compound-vinyl cyanide compound graft copolymer may be a graft copolymer including 40 to 80% by weight of conjugated diene rubber having an average particle diameter of 100 to 500 nm, 10 to 40% by weight of an aromatic vinyl compound, and 1 to 20% by weight of a vinyl cyanide compound.

The conjugated diene-aromatic vinyl compound-vinyl cyanide compound bulk copolymer may be a bulk copolymer including 5 to 20% by weight of conjugated diene rubber having an average particle diameter of 800 to 10,000 nm, 50 to 85% by weight of an aromatic vinyl compound, and 10 to 30% by weight of a vinyl cyanide compound.

The conjugated diene-aromatic vinyl compound-vinyl cyanide compound graft copolymer and the conjugated diene-aromatic vinyl compound-vinyl cyanide compound bulk copolymer may be included in a weight ratio (graft copolymer:bulk copolymer) of 1:0.8 to 1.7.

The copolymer composed of an acrylate-based compound-alkyl-substituted aromatic vinyl compound-vinyl cyanide compound may be a copolymer including 40 to 60% by weight of an acrylate-based compound, 30 to 40% by weight of an alkyl-substituted aromatic vinyl compound, and 1 to 20% by weight of a vinyl cyanide compound.

The alkyl-substituted aromatic vinyl compound may be styrene substituted with an alkyl group having 1 to 3 carbon atoms.

The maleimide-based polymer may include 20% by weight or more of a maleimide-based monomer.

The maleimide-based polymer may include 45 to 55% by weight of a maleimide-based compound, 40 to 50% by weight of an aromatic vinyl compound, and 1 to 10% by weight of maleic acid or an anhydride thereof.

The maleimide-based compound may be maleimide and/or N-(substituted) maleimide.

The thermoplastic resin composition may further includes 0.1 to 5% by weight of one or more additives selected from the group consisting of an antioxidant, lubricant, a hydrolysis suppressor, a flame retardant, a nucleating agent, a heat stabilizer, a light stabilizer, and a thickener.

The thermoplastic resin composition may have a room-temperature impact strength of 9.3 $KJ/m^2$ or more as measured according to standard measurement ISO 180/1A. The thermoplastic resin composition may have a heat deflection temperature of 86° C. or higher as measured under 1.80 MPa according to standard measurement ISO 75.

In accordance with another aspect of the present disclosure, provided is a method of preparing a thermoplastic resin composition, including:

desalting waste polyester fishing nets having an intrinsic viscosity (IV) of 0.6 to 0.9 dl/g to obtain waste fishing net pellets and chip-molding the waste fishing net pellets to prepare a recycled resin containing 60 to 99.9% by weight in total of Ca, Fe, and S and 0.1 to 40% by weight in total of Na, Mg, Al, Si, K, Ti, Ni, Zn, Sb, and Cl, based on 100% by weight of total inorganic components as measured using Inductively Coupled Plasma Optical Emission spectroscopy (ICP-OES) equipment; and melt-kneading and extruding 1 to 12% by weight of the recycled resin, 12.7 to 20% by weight of a polyester resin, greater than 15% by weight and 18% by weight or less of a conjugated diene-aromatic vinyl compound-vinyl cyanide compound graft copolymer, greater than 15% by weight and 22% by weight or less of a conjugated diene-aromatic vinyl compound-vinyl cyanide compound bulk copolymer, 27 to 45% by weight of a copolymer composed of an acrylate-based compound-alkyl-substituted aromatic vinyl compound-vinyl cyanide compound, 8 to 12.5% by weight of a maleimide-based polymer, and 0.1 to 5% by weight of additives, wherein the thermoplastic resin composition has a heat deflection temperature of 86° C. or higher as measured under 1.80 MPa according to standard measurement ISO 75.

The recycled resin may be a product obtained by pre-cutting waste fishing nets made of polyethylene terephthalate having an intrinsic viscosity (IV) of 0.6 to 0.9 dl/g, removing sand and salts therefrom, cutting the pre-cut and washed waste fishing nets, and extruding the cut waste fishing nets. In accordance with yet another aspect of the present disclosure, provided is a molded article manufactured using the above-described thermoplastic resin composition.

The molded article may be an automotive part, and may include a center fascia or a door trim.

Advantageous Effects

According to the present disclosure, the present disclosure has an effect of providing a thermoplastic resin composition having tensile strength and flexural modulus equal or superior to those of a conventional polyester composite material; having greatly improved impact strength, flexural strength, and heat deflection temperature under high load; and thus being suitable for lightweight automotive parts requiring high heat resistance and high rigidity, and a molded article manufactured using the thermoplastic resin composition.

Therefore, the thermoplastic resin composition and the molded article according to the present disclosure can be used to manufacture automotive parts. Specifically, the thermoplastic resin composition and the molded article according to the present disclosure can be used to manufacture lightweight automotive parts, such as a center fascia and a door trim, that require high heat resistance and high rigidity.

BRIEF DESCRIPTION OF DRAWINGS

FIG. 1 is a flowchart showing a process of processing waste fishing nets to prepare a waste fishing net resin, which is used in an embodiment to be described later.

FIG. 2 includes an image (A) of a fishing net (before use), an image (B) of a waste fishing net (after use), and an image (C) of a waste fishing net resin obtained according to the process of FIG. 1.

DETAILED DESCRIPTION

Hereinafter, the present disclosure will be described in more detail to aid in understanding of the present disclosure.

The terms and words which are used in the present specification and the appended claims should not be construed as being confined to common meanings or dictionary meanings but should be construed as having meanings and concepts matching the technical spirit of the present disclosure in order to describe the present disclosure in the best fashion.

In this description, unless otherwise defined, a polymer including a certain compound means polymer prepared by polymerizing the compound, and a unit in the polymer is derived from the compound.

The present inventors confirmed that, when a polyester composite material composed of a polyester resin and a reinforcing resin, a maleimide-based polymer, and a recycled resin obtained by desalting waste fishing nets were included, a thermoplastic resin composition having tensile strength and flexural modulus equal or superior to those of a conventional polyester composite material; having greatly improved impact strength, flexural strength, and heat deflection temperature under high load; and thus being suitable for lightweight automotive parts requiring high heat resistance and high rigidity was prepared. Based on these results, the present inventors conducted further studies to complete the present disclosure.

In the present disclosure, the composition ratio of a (co) polymer may mean the content of units constituting the (co) polymer, or may mean the content of units input during polymerization of the (co) polymer.

In the present disclosure, “content” means weight unless otherwise defined.

The thermoplastic resin composition of the present disclosure includes 12.7 to 20% by weight of a polyester resin, 1 to 12% by weight of a recycled resin or a polyamide/polyalkylene terephthalate alloy resin, greater than 15% by weight and 18% by weight or less of a conjugated diene-aromatic vinyl compound-vinyl cyanide compound graft copolymer, greater than 15% by weight and 22% by weight or less of a conjugated diene-aromatic vinyl compound-vinyl cyanide compound bulk copolymer, 27 to 45% by weight of a copolymer composed of an acrylate-based compound-alkyl-substituted aromatic vinyl compound-vinyl cyanide compound, and 8 to 12.5% by weight of a maleimide-based polymer. In this case, the present disclosure has an effect of providing a thermoplastic resin composition having tensile strength and flexural modulus equal or superior to those of a conventional polyester composite material; having greatly improved impact strength, flexural strength, and heat deflection temperature under high load; and thus being suitable for lightweight automotive parts requiring high rigidity.

Unless specified otherwise, the content of each of the polyester resin, the recycled resin, the conjugated diene-aromatic vinyl compound-vinyl cyanide compound graft copolymer, the conjugated diene-aromatic vinyl compound-vinyl cyanide compound bulk copolymer, the copolymer composed of an acrylate-based compound-alkyl-substituted aromatic vinyl compound-vinyl cyanide compound, and the maleimide-based polymer constituting the thermoplastic resin composition of the present disclosure is based on 100% by weight in total of the polyester resin, the recycled resin, the conjugated diene-aromatic vinyl compound-vinyl cyanide compound graft copolymer, the conjugated diene-aromatic vinyl compound-vinyl cyanide compound bulk copolymer, the copolymer composed of an acrylate-based compound-alkyl-substituted aromatic vinyl compound-vinyl cyanide compound, the maleimide-based polymer, and the additives, which are components constituting the thermoplastic resin composition.

In addition, the thermoplastic resin composition of the present disclosure includes 12.7 to 20% by weight of a polyester resin, 1 to 12% by weight of a recycled resin or a polyamide/polyalkylene terephthalate alloy resin, greater than 15% by weight and 18% by weight or less of a conjugated diene-aromatic vinyl compound-vinyl cyanide compound graft copolymer, greater than 15% by weight and 22% by weight or less of a conjugated diene-aromatic vinyl compound-vinyl cyanide compound bulk copolymer, 27 to 45% by weight of a copolymer composed of an acrylate-based compound-alkyl-substituted aromatic vinyl compound-vinyl cyanide compound, 8 to 12.5% by weight of a maleimide-based polymer, and 0.1 to 5% by weight of additives. In this case, the recycled resin is a product obtained by desalting and chip-molding waste fishing net pellets containing 60 to 99.9% by weight in total of Ca, Fe, and S and 0.1 to 40% by weight in total of Na, Mg, Al, Si, K, Ti, Ni, Zn, Sb, and Cl based on 100% by weight in total of inorganic components as measured using ICP-OES equipment. In this case, the present disclosure may provide a thermoplastic resin composition having tensile strength and flexural modulus equal or superior to those of a conventional polyester composite material; having greatly improved impact strength, flexural strength, and heat deflection temperature under high load; and thus being suitable for lightweight automotive parts requiring high rigidity.

Hereinafter, each of the components constituting the thermoplastic resin composition of the present disclosure is described in detail as follows.

Polyester Resin

In one embodiment of the present disclosure, the polyester resin includes a polyalkylene terephthalate. Considering physical properties and cost, polybutylene terephthalate may be preferably used as the polyester resin.

The polybutylene terephthalate may be obtained by direct esterification of 1,4-butanediol and terephthalic acid or dimethyl terephthalate or by condensation polymerization after transesterification of 1,4-butanediol and terephthalic acid or dimethyl terephthalate.

Polybutylene terephthalate as the polyester resin has an intrinsic viscosity (IV) of preferably 1.1 dl/g or more, more preferably 1.1 to 1.3 dl/g as measured according to ASTM D2857. When the intrinsic viscosity of the polyester resin, particularly polybutylene terephthalate, is within this range, a thermoplastic resin composition having excellent balance between mechanical properties and processability may be obtained.

In the present disclosure, when intrinsic viscosity is measured, unless noted otherwise, a sample solution with a concentration of 0.05 g/ml is prepared by completely dissolving a sample in methylene chloride as a solvent, and then is filtered using a filter to obtain a filtrate. Then, using the obtained filtrate, intrinsic viscosity is measured at 20° ° C. using a Ubbelohde viscometer.

In one embodiment of the present disclosure, based on a total weight of the polyester resin, the recycled resin, the conjugated diene-aromatic vinyl compound-vinyl cyanide compound graft copolymer, the conjugated diene-aromatic vinyl compound-vinyl cyanide compound bulk copolymer, the copolymer composed of an acrylate-based compound-alkyl-substituted aromatic vinyl compound-vinyl cyanide compound, the maleimide-based polymer, and the additives, which are components constituting the thermoplastic resin composition, the polyester resin may be included in an amount of 12.7 to 20% by weight, preferably 13 to 19% by weight, more preferably 14 to 18.5% by weight. When the polyester resin is included in an amount satisfying the above range, a thermoplastic resin composition having excellent balance between chemical resistance and mechanical properties may be obtained.

Recycled Resin

In one embodiment of the present disclosure, the recycled resin may include a resin obtained by processing waste fishing nets.

The waste fishing net may be a resin containing polyamide and polyethylene terephthalate, and may include a portion of polyamide and polyethylene terephthalate prepared by condensation polymerization of terephthalic acid and ethylene glycol, but the present disclosure is not limited thereto.

Based on the polyethylene terephthalate, the polyamide may be included in an amount of 3 to 48 mol %, preferably 5 to 20 mol %. When the polyamide is included in an amount satisfying the above range, a thermoplastic resin composition having excellent balance between surface smoothness, heat resistance, and high rigidity may be obtained.

In one embodiment of the present disclosure, the polyamide-polyethylene terephthalate has an intrinsic viscosity (IV) of preferably 0.6 to 0.9 dl/g, more preferably 0.7 to 0.9 dl/g as measured according to ASTM D2857. Within the intrinsic viscosity of the polyamide-polyethylene terephthalate is within this range, a thermoplastic resin composition having excellent balance between mechanical properties, moldability, and high rigidity may be obtained.

In one embodiment of the present disclosure, for example, the recycled resin may be a black chip obtained by desalting a waste fishing net having a size of 2 km×80 m according to a flowchart of FIG. 1 to be described later. At this time, the size corresponds to the approximate size of a fishing net used in a tuna purse seiner.

FIG. 1 below is a flowchart showing a process of preparing a recycled resin or a polyamide/polyalkylene terephthalate alloy resin used in examples to be described later.

According to FIG. 1 below, in step S1, waste fishing nets (polyamide: 80% by weight and polyethylene terephthalate: 20% by weight) having a size of 2 km×80 m are pre-cut using a cutting machine. The cut size at the time of pre-cutting is not particularly limited. In addition, when using about 200 kg of waste fishing nets after cleaning, the washing and desalting processes described later may be easily performed.

Subsequently, in step S2, the pre-cut waste fishing nets are put into an industrial washing machine and washed for about 5 to 15 hours to primarily remove salt while removing sand.

In step S3, the washed waste fishing nets are put into a centrifugal separator equipped with blades, cut into sizes of 5 to 15 cm, and desalted.

Then, in step S4, extrusion is performed in a temperature range of 200 to 270° C. and pelletization is performed to manufacture chips.

Inorganic materials included in the obtained recycled resin were analyzed using ICP-OES equipment, and the results are shown in Table 1 below.

TABLE 1

| Detected Ingredients | Chemical-based PET white chips (mg/kg) | Black chips obtained by desalting waste fishing nets (mg/kg) |
|---|---|---|
| Na | <10 | 80 |
| Mg | <10 | 80 |
| Al | <10 | 50 |
| Si | <10 | 50 |
| K | <10 | 30 |
| Ca | <10 | 420 |
| Ti | <10 | 30 |
| Fe | <10 | 560 |
| Ni | <10 | <10 |
| Zn | <10 | 120 |
| Sb | <10 | 100 |
| Cl | <10 | 100 |
| S | 10 | 750 |

As shown in Table 1, the resin obtained by processing waste fishing nets may be an extruded product obtained by desalting and chip-molding waste fishing net pellets including 60 to 99.9% by weight, preferably 60 to 90% by weight, more preferably 60 to 80% by weight in total of Ca, Fe, and S and 0.1 to 40% by weight, preferably 10 to 40% by weight, more preferably 20 to 40% by weight in total of Na, Mg, Al, Si, K, Ti, Ni, Zn, Sb, and Cl based on 100% by weight in total of inorganic components as measured using ICP-OES equipment. Within the above-described range, a thermoplastic resin composition having excellent balance between mechanical properties and moldability may be obtained.

Based on a total weight of the polyester resin, the recycled resin, the conjugated diene-aromatic vinyl compound-vinyl cyanide compound graft copolymer, the conjugated diene-aromatic vinyl compound-vinyl cyanide compound bulk copolymer, the copolymer composed of an acrylate-based compound-alkyl-substituted aromatic vinyl compound-vinyl cyanide compound, the maleimide-based polymer, and the additives, which are components constituting the thermoplastic resin composition, the resin obtained by processing waste fishing nets may be included in an amount of 1 to 12% by weight, preferably 3 to 11% by weight, more preferably 5 to 10% by weight. When the waste fishing net chips are included in a amount within this range, a thermoplastic resin composition having excellent balance between chemical resistance, mechanical properties, and heat resistance may be obtained.

Conjugated Diene-Aromatic Vinyl Compound-Vinyl Cyanide Compound Copolymers

The thermoplastic resin composition of the present disclosure may include a conjugated diene-aromatic vinyl compound-vinyl cyanide compound graft copolymer obtained by graft-polymerizing conjugated diene rubber, an aromatic vinyl compound, and a vinyl cyanide compound and a conjugated diene-aromatic vinyl compound-vinyl cyanide compound bulk copolymer including a conjugated diene polymer, an aromatic vinyl compound, and a vinyl cyanide compound.

In the thermoplastic resin composition, a weight ratio (graft copolymer:bulk copolymer) of the conjugated diene-aromatic vinyl compound-vinyl cyanide compound graft copolymer to the conjugated diene-aromatic vinyl compound-vinyl cyanide compound bulk copolymer may be 1:0.8 to 1.7, 1:0.8 to 1.5, or 1:0.9 to 1.2. In this case, the thermoplastic resin composition may have tensile strength, elongation, and flexural strength equal or superior to those of a conventional polyester composite material, may have greatly improved impact strength, flexural modulus, and heat deflection temperature under high load, and thus may be used as a material suitable for manufacturing lightweight automotive parts having high rigidity.

Each copolymer is described in detail as follows.

Conjugated Diene-Aromatic Vinyl Compound-Vinyl Cyanide Compound Graft Copolymer

In one embodiment of the present disclosure, the conjugated diene-aromatic vinyl compound-vinyl cyanide compound graft copolymer may be obtained by graft-polymerizing conjugated diene rubber, an aromatic vinyl compound, and a vinyl cyanide compound. The graft copolymer may impart excellent processability to the thermoplastic resin composition and may serve as an impact modifier in a molded article containing the thermoplastic resin composition.

The conjugated diene rubber may include a modified conjugated diene polymer obtained by graft-polymerizing an aromatic vinyl compound and a vinyl cyanide compound onto a conjugated diene polymer prepared by polymerizing a conjugated diene monomer. Here, a conjugated diene polymer may be referred to as conjugated diene rubber.

For example, the conjugated diene rubber may be latex obtained by dispersing colloidal conjugated diene rubber in water (here, weight is based on solids). In this case, mechanical strength and processability may be excellent.

The conjugated diene rubber refers to a (co) polymer prepared by polymerizing a conjugated diene compound having a structure in which a double bond and a single bond are alternately arranged. For example, the conjugated diene rubber may be selected from a butadiene polymer, a butadiene-styrene copolymer, and a butadiene-acrylonitrile copolymer.

In addition, for example, the conjugated diene monomer may include one or more selected from 1,3-butadiene, isoprene, chloroprene, and piperylene, preferably 1,3-butadiene.

For example, the conjugated diene polymer may have an average particle diameter of 0.01 to 1 μm, preferably 0.03 to 0.8 μm, more preferably 0.05 to 0.5 μm. Within this range, the impact strength, processability, surface properties, and surface gloss of a molded article manufactured using the thermoplastic resin composition of the present disclosure may be further improved.

In the present disclosure, average particle diameter may be measured by dynamic light scattering. Specifically, the average particle diameter of a specimen in latex form may be measured in a Gaussian mode using a particle size distribution analyzer (Nicomp 380). In addition, the average particle diameter may be an arithmetic average particle diameter in a particle diameter distribution measured by dynamic light scattering, specifically, a scattering intensity average particle diameter.

As a specific measurement example, a sample is prepared by diluting 0.1 g of latex (TSC: 35 to 50 wt %) 1,000 to 5,000-fold with distilled water, i.e., a sample is diluted appropriately so as not to deviate significantly from an intensity setpoint of 300 kHz, and is placed in a glass tube. Then, the average particle diameter of the sample is measured using a flow cell in auto-dilution in a measurement mode of dynamic light scattering/intensity 300 kHz/intensity-weight Gaussian analysis. At this time, setting values are as follows: temperature: 23° C.; measurement wavelength: 632.8 nm; and channel width: 10 usec.

For example, based on 100% by weight in total of all components constituting the conjugated diene-aromatic vinyl compound-vinyl cyanide compound graft copolymer, the conjugated diene polymer may be included in an amount of 40 to 80% by weight, preferably 45 to 75% by weight, more preferably 50 to 70% by weight. Within this range, the impact strength, processability, surface properties, and surface gloss of a molded article manufactured using the thermoplastic resin composition of the present disclosure may be further improved.

For example, the shell of the copolymer may have a weight average molecular weight of 70,000 to 300,000 g/mol, preferably 80,000 to 170,000 g/mol, more preferably 90,000 to 150,000 g/mol. Within this range, mechanical properties may be improved.

The shell of the copolymer may be formed by graft-polymerizing an aromatic vinyl compound and an vinyl cyanide compound onto a conjugated diene polymer.

For example, the aromatic vinyl compound may include one or more selected from styrene, α-methylstyrene, β-methylstyrene, α-ethylstyrene, β-ethylstyrene, vinyl toluene, and derivatives thereof, preferably styrene.

For example, based on 100% by weight in total of the conjugated diene-aromatic vinyl compound-vinyl cyanide compound graft copolymer, the aromatic vinyl compound may be included in an amount of 10 to 45% by weight, preferably 20 to 40% by weight, more preferably 20 to 30% by weight, most preferably 25 to 30% by weight. Within this range, the mechanical properties of a molded article manufactured using the thermoplastic resin composition of the present disclosure may be further improved.

For example, the vinyl cyanide compound may include one or more selected from acrylonitrile, methacrylonitrile, ethacrylonitrile, phenylacrylonitrile, α-chloroacrylonitrile, and derivatives thereof, preferably acrylonitrile.

For example, based on 100% by weight in total of the conjugated diene-aromatic vinyl compound-vinyl cyanide compound graft copolymer, the vinyl cyanide compound may be included in an amount of 1 to 25% by weight, preferably 5 to 19% by weight, more preferably 7 to 15% by weight. Within this range, the mechanical properties of a molded article manufactured using the thermoplastic resin composition of the present disclosure may be further improved.

The copolymer may be prepared by polymerizing an aromatic vinyl compound and a vinyl cyanide compound in the presence of a conjugated diene polymer using one or more methods selected from emulsion polymerization, suspension polymerization, and bulk polymerization, preferably emulsion polymerization.

The emulsion polymerization may be graft emulsion polymerization, and may be performed, for example, at 50 to 90° C., preferably 60 to 85° C.

The emulsion polymerization may be performed in the presence of an initiator and an emulsifier.

The initiator is a radical initiator. As a specific example, the initiator may include one or more selected from inorganic peroxides including sodium persulfate, potassium persulfate, ammonium persulfate, potassium superphosphate, and hydrogen peroxide; organic peroxides including t-butyl peroxide, cumene hydroperoxide, p-menthane hydroperoxide, di-t-butyl peroxide, t-butylcumyl peroxide, acetyl peroxide, isobutyl peroxide, octanoyl peroxide, dibenzoyl peroxide, 3,5,5-trimethylhexanol peroxide, and t-butylperoxy isobutyrate; and azo compounds including azobis isobutyronitrile, azobis-2,4-dimethylvaleronitrile, azobis(cyclohexanecarbonylnitrile), and azobis isobutyric acid methyl.

In addition to the initiator, an activator may be further added to promote initiation reaction.

For example, the activator may include one or more selected from sodium formaldehyde sulfoxylate, sodium ethylenediamine tetraacetate, ferrous sulfate, dextrose, sodium pyrophosphate, anhydrous sodium pyrophosphate, and sodium sulfate.

For example, based on 100 parts by weight in total of the monomers (including conjugated diene polymer) constituting the copolymer, the initiator may be added in an amount of 0.001 to 1 part by weight, preferably 0.01 to 0.5 parts by weight, more preferably 0.02 to 0.1 parts by weight. Within this range, polymerization may emulsion be facilitated, and the remaining amount of the initiator in the copolymer may be minimized to an amount of several tens of ppm.

For example, the emulsifier may include one or more selected from a potassium compound of alkylbenzene sulfonate, a sodium compound of alkylbenzene sulfonate, a potassium compound of alkyl carboxylate, a sodium compound of alkyl carboxylate, a potassium compound of oleic acid, a sodium compound of oleic acid, a potassium compound of alkyl sulfate, a sodium compound of alkyl sulfate, a potassium compound of alkyl dicarboxylate, a sodium compound of alkyl dicarboxylate, a potassium compound of alkyl ether sulfonate, a sodium compound of alkyl ether sulfonate, and an ammonium compound of allyloxynonylphenoxypropane-2-yloxy methylsulfonate, preferably sodium dodecylbenzenesulfonate.

A commercially available emulsifier may be used as the emulsifier. In this case, one or more selected from SE10N, BC-10, BC-20, HS10, Hitenol KH10, and PD-104 may be used.

For example, based on 100 parts by weight in total of the monomers (including conjugated diene polymer) constituting the copolymer, the emulsifier may be added in an amount of 0.15 to 2.0 parts by weight, preferably 0.3 to 1.5 parts by weight, more preferably 0.5 to 1.2 parts by weight. Within this range, emulsion polymerization may be facilitated, and the remaining amount of the initiator in the copolymer may be minimized to an amount of several tens of ppm.

When emulsion polymerization is performed, a molecular weight modifier may be further added. For example, the molecular weight modifier may include one or more selected from t-dodecyl mercaptan, n-dodecyl mercaptan, and an alpha-methyl styrene dimer, preferably t-dodecyl mercaptan.

For example, based on 100 parts by weight in total of the monomers (including conjugated diene polymer) constituting the copolymer, the molecular weight modifier may be added in an amount of 0.1 to 1 part by weight, preferably 0.2 to 0.8 parts by weight, more preferably 0.4 to 0.6 parts by weight.

The emulsion polymerization may be initiated after monomers are fed into a reactor batchwise. Alternatively, some of monomers may be fed into a reactor before start of emulsion polymerization, and the remainder may be fed continuously into the reactor after start of emulsion polymerization, or emulsion polymerization may be performed while continuously feeding monomers for a certain period of time.

The obtained conjugated diene-aromatic vinyl compound-vinyl cyanide compound graft copolymer may be in the form of latex, and may be recovered in a dried powder form through aggregation, dehydration, and drying processes.

As a coagulant used for aggregation, salts such as calcium chloride, magnesium sulfate, and aluminum sulfate, acidic substances such as sulfuric acid, nitric acid, and hydrochloric acid, and mixtures thereof may be used.

For example, based on 100% by weight in total of all components (the polyester resin, recycled resin, the conjugated diene-aromatic vinyl compound-vinyl cyanide compound graft copolymer, the conjugated diene-aromatic vinyl compound-vinyl cyanide compound bulk copolymer, the copolymer composed of an acrylate-based compound-alkyl-substituted aromatic vinyl compound-vinyl cyanide compound, the maleimide-based polymer, and the additives) constituting the thermoplastic resin composition, the conjugated diene-aromatic vinyl compound-vinyl cyanide compound graft copolymer may be included in an amount of greater than 15% by weight and 18% by weight or less, preferably 16 to 18% by weight, more preferably 16 to 18% by weight. Within this range, a molded article manufactured by injecting the thermoplastic resin composition of the present disclosure may have excellent mechanical properties and injection quality.

Conjugated Diene-Aromatic Vinyl Compound-Vinyl Cyanide Compound Bulk Copolymer

Since the conjugated diene-aromatic vinyl compound-vinyl cyanide compound copolymer used herein is prepared by bulk polymerization, manufacturing cost may be reduced, and mechanical properties may be excellent.

When bulk polymerization is used, since additives such as emulsifiers and suspending agents are not added, a high-purity copolymer with a minimized amount of impurities may be prepared. Accordingly, to prepare a thermoplastic resin composition capable of maintaining transparency, it is advantageous to include a copolymer prepared by bulk polymerization.

For example, when the bulk polymerization is performed, an organic solvent as a reaction medium and, when necessary, additives such as a molecular weight modifier and a polymerization initiator are added to a monomer mixture.

As a specific example, the bulk polymerization may be performed by mixing 100 parts by weight of a monomer mixture including a conjugated diene polymer, an aromatic vinyl compound, and a vinyl cyanide compound, 20 to 40 parts by weight of a reaction medium, and 0.05 to 0.5 parts by weight of a molecular weight modifier and polymerizing the mixture at a reaction temperature of 130 to 170° C. for 2 to 4 hours.

Solvents commonly used in the art may be used as the reaction medium without particular limitation. For example, the reaction medium may be an aromatic hydrocarbon-based compound such as ethylbenzene, benzene, toluene, or xylene.

For example, a method of preparing the conjugated diene-aromatic vinyl compound-vinyl cyanide compound bulk copolymer may be performed using a continuous processing machine consisting of a raw material input pump, a continuous stirring tank into which reaction raw materials are continuously fed, a pre-heating tank for pre-heating a polymer solution discharged from the continuous stirring tank, a volatilization tank for volatilizing unreacted monomers and/or a reaction medium, a polymer transfer pump, and an extruder for preparing a polymer in the form of pellets.

At this time, extrusion processing may be performed at 210 to 240° C., but the present disclosure is not limited thereto.

A commercially available product may be used as the conjugated diene-aromatic vinyl compound-vinyl cyanide compound bulk copolymer as long as the product meets the definition of the conjugated diene-aromatic vinyl compound-vinyl cyanide compound bulk copolymer of the present disclosure.

In one embodiment of the present disclosure, for example, the conjugated diene-aromatic vinyl compound-vinyl cyanide compound bulk copolymer may be a copolymer including a conjugated diene polymer having an average particle diameter of 50 to 500 nm. In this case, mechanical properties, such as impact strength and tensile strength, heat resistance, colorability, and weather resistance may be excellent.

The conjugated diene polymer may include a modified conjugated diene polymer obtained by graft-polymerizing an aromatic vinyl compound and a vinyl cyanide compound onto a conjugated diene polymer prepared by polymerizing a conjugated diene monomer. Here, a conjugated diene polymer may be referred to as conjugated diene rubber.

For example, the conjugated diene rubber may be latex obtained by dispersing colloidal conjugated diene rubber in water (here, weight is based on solids). In this case, mechanical strength and processability may be excellent.

The conjugated diene rubber refers to a (co) polymer prepared by polymerizing a conjugated diene compound having a structure in which a double bond and a single bond are alternately arranged. For example, the conjugated diene rubber may be selected from a butadiene polymer, a butadiene-styrene copolymer, and a butadiene-acrylonitrile copolymer.

In addition, for example, the conjugated diene monomer may include one or more selected from 1,3-butadiene, isoprene, chloroprene, and piperylene, preferably 1,3-butadiene.

For example, the conjugated diene polymer may have an average particle diameter of 0.01 to 1 μm, preferably 0.03 to 0.8 μm, more preferably 0.05 to 0.5 μm. Within this range, the impact strength, processability, surface properties, and surface gloss of a molded article manufactured using the thermoplastic resin composition of the present disclosure may be further improved.

For example, based on 100% by weight in total of the conjugated diene-aromatic vinyl compound-vinyl cyanide compound bulk copolymer, the conjugated diene polymer may be included in an amount of 40 to 80% by weight, preferably 45 to 75% by weight, more preferably 50 to 70% by weight. Within this range, the impact t strength, processability, surface properties, and surface gloss of a molded article manufactured using the thermoplastic resin composition of the present disclosure may be further improved.

For example, the shell of the copolymer may have a weight average molecular weight of 70,000 to 300,000 g/mol, preferably 80,000 to 170,000 g/mol, more preferably 90,000 to 150,000 g/mol. Within this range, mechanical properties may be improved.

The shell of the copolymer may be formed by graft-polymerizing an aromatic vinyl compound and an vinyl cyanide compound onto a conjugated diene polymer.

For example, the aromatic vinyl compound may include one or more selected from styrene, α-methylstyrene, β-methylstyrene, α-ethylstyrene, β-ethylstyrene, vinyl toluene, and derivatives thereof, preferably styrene.

For example, based on 100% by weight in total of the conjugated diene-aromatic vinyl compound-vinyl cyanide compound bulk copolymer, the aromatic vinyl compound may be included in an amount of 10 to 45% by weight, preferably 20 to 40% by weight, more preferably 20 to 30% by weight, most preferably 25 to 30% by weight. Within this range, the mechanical properties of a molded article manufactured using the thermoplastic resin composition of the present disclosure may be further improved.

For example, the vinyl cyanide compound may include one or more selected from acrylonitrile, methacrylonitrile, ethacrylonitrile, phenylacrylonitrile, α-chloroacrylonitrile, and derivatives thereof, preferably acrylonitrile.

For example, based on 100% by weight in total of the conjugated diene-aromatic vinyl compound-vinyl cyanide compound bulk copolymer, the vinyl cyanide compound may be included in an amount of 1 to 25% by weight, preferably 5 to 19% by weight, more preferably 7 to 15% by weight. Within this range, the mechanical properties of a molded article manufactured using the thermoplastic resin composition of the present disclosure may be further improved.

A commercially available product may be used as the conjugated diene-aromatic vinyl compound-vinyl cyanide compound bulk copolymer as long as the product meets the definition of the conjugated diene-aromatic vinyl compound-vinyl cyanide compound bulk copolymer of the present disclosure.

For example, the conjugated diene-aromatic vinyl compound-vinyl cyanide compound bulk copolymer may have a weight average molecular weight of 40,000 to 200,000 g/mol, preferably 60,000 to 190,000 g/mol, more preferably 80,000 to 190,000 g/mol. Within this range, processability may be excellent due to proper fluidity, and mechanical properties such as tensile strength and impact strength may be excellent.

In the present disclosure, weight average molecular weight may be measured using tetrahydrofuran (THF) as an eluate through gel permeation chromatography (GPC, Waters Breeze). In this case, weight average molecular weight is obtained as a relative value to a polystyrene (PS) standard sample. Specifically, the weight average molecular weight is a weight average molecular weight (Mw) converted based on polystyrene by gel permeation chromatography (GPC, PL GPC220, Agilent Technologies).

Specifically, a polymer to be measured is dissolved in tetrahydrofuran to a concentration of 1%, and 10 μl of the dissolved sample is injected into a gel permeation chromatograph (GPC) at a flow rate of 0.3 mL/min. At this time, analysis is performed at a sample concentration of 2.0 mg/mL (100 μl injection) at 30° C. In this case, two columns (PL mixed B, Waters Co.) are connected in series, and an RI detector (2414, Agilent Waters Co.) is used. At this time, measurement is performed at 40° ° C., and data is processed using ChemStation.

Based on a total weight of all components (the polyester resin, the recycled resin, the conjugated diene-aromatic vinyl compound-vinyl cyanide compound graft copolymer, the conjugated diene-aromatic vinyl compound-vinyl cyanide compound bulk copolymer, the copolymer composed of an acrylate-based compound-alkyl-substituted aromatic vinyl compound-vinyl cyanide compound, the maleimide-based polymer, and the additives) constituting the thermoplastic resin composition, the conjugated diene-aromatic vinyl compound-vinyl cyanide compound bulk copolymer may be included in an amount of greater than 15% by weight and 22% by weight or less, preferably 16 to 22% by weight, more preferably 16 to 20% by weight. When the conjugated diene-aromatic vinyl compound-vinyl cyanide compound bulk copolymer is included in an amount satisfying the above range, a thermoplastic resin composition having excellent balance between chemical resistance and mechanical properties may be obtained.

Copolymer Composed of Acrylate-Based Compound-Alkyl-Substituted Aromatic Vinyl Compound-Vinyl Cyanide Compound In one embodiment of the present disclosure, the copolymer composed of an acrylate-based compound-alkyl-substituted aromatic vinyl compound-vinyl cyanide compound may be obtained by graft-polymerizing an acrylate-based compound, an alkyl-substituted aromatic vinyl compound, and a vinyl cyanide compound. In this case, mechanical properties, such as impact strength and tensile strength, heat resistance, colorability, and weather resistance may be excellent.

For example, based on a total weight of all components constituting the copolymer composed of an acrylate-based compound-alkyl-substituted aromatic vinyl compound-vinyl cyanide compound, the acrylate-based compound may be included in an amount of 40 to 47% by weight, preferably 40 to 45% by weight, more preferably 40 to 43% by weight. Within this range, weather resistance, impact strength, and scratch resistance may be excellent.

For example, the acrylate-based compound may be a (meth)acrylate-based monomer.

In the present disclosure, the (meth)acrylate-based monomer includes both an acrylate-based monomer and a methacrylate-based monomer.

For example, the (meth)acrylate-based monomer may include one or more selected from alkyl (meth)acrylates having 2 to 8 carbon atoms, preferably an alkyl acrylate containing an alkyl group having 4 to 8 carbon atoms, more preferably butyl acrylate or ethylhexyl acrylate.

The alkyl-substituted aromatic vinyl compound included in the copolymer composed of an acrylate-based compound-alkyl-substituted aromatic vinyl compound-vinyl cyanide compound may include one or more selected from α-methylstyrene, α-ethylstyrene, and p-methylstyrene, preferably styrene.

For example, based on a total weight of all components s constituting the copolymer composed of an acrylate-based compound-alkyl-substituted aromatic vinyl compound-vinyl cyanide compound, the aromatic vinyl compound included in the copolymer composed of an acrylate-based compound-alkyl-substituted aromatic vinyl compound-vinyl cyanide compound may be included in an amount of 30 to 37% by weight, preferably 33 to 37% by weight. Within this range, mechanical properties, such as tensile strength and impact strength, and processability may be excellent.

For example, the alkyl-substituted aromatic vinyl compound may include one or more selected from the group consisting of α-methyl styrene, o-methyl styrene, p-methyl styrene, m-methyl styrene, ethyl styrene, isobutyl styrene, vinyltoluene, vinylxylene, and vinylnaphthalene. In this case, processability may be excellent due to proper fluidity, and mechanical properties such as tensile strength and impact strength may be excellent.

The vinyl cyanide compound included in the copolymer composed of an acrylate-based compound-alkyl-substituted aromatic vinyl compound-vinyl cyanide compound may include one or more selected from acrylonitrile, methacrylonitrile, ethacrylate, phenyl acrylonitrile, α-chloroacrylonitrile, and ethacrylonitrile, preferably acrylonitrile.

For example, based on a total weight of all components constituting the copolymer composed of an acrylate-based compound-alkyl-substituted aromatic vinyl compound-vinyl cyanide compound, the vinyl cyanide compound included in the copolymer composed of an acrylate-based compound-alkyl-substituted aromatic vinyl compound-vinyl cyanide compound may be included in an amount of 23 to 28% by weight, preferably 23 to 26% by weight, more preferably 24 to 26% by weight. Within this range, impact resistance and processability may be excellent.

In the present disclosure, the term "total weight of a copolymer" may mean the actual total weight of the obtained copolymer or may mean the total weight of rubber and/or monomers added instead of the copolymer.

A commercially available product may be used as the copolymer composed of an acrylate-based compound-alkyl-substituted aromatic vinyl compound-vinyl cyanide compound as long as the product meets the definition of the copolymer composed of an acrylate-based compound-alkyl-substituted aromatic vinyl compound-vinyl cyanide compound of the present disclosure.

For example, the copolymer composed of an acrylate-based compound-alkyl-substituted aromatic vinyl compound-vinyl cyanide compound may have a weight average molecular weight of 40,000 to 200,000 g/mol, preferably 60,000 to 190,000 g/mol, more preferably 80,000 to 190,000 g/mol. Within this range, processability may be excellent due to proper fluidity, and mechanical properties such as tensile strength and impact strength may be excellent.

In the present disclosure, weight average molecular weight may be measured using tetrahydrofuran (THF) as an eluate through gel permeation chromatography (GPC, Waters Breeze). In this case, weight average molecular weight is obtained as a relative value to a polystyrene (PS) standard sample. Specifically, the weight average molecular weight is a weight average molecular weight (Mw) converted based on polystyrene by gel permeation chromatography (GPC, PL GPC220, Agilent Technologies).

Specifically, a polymer to be measured is dissolved in tetrahydrofuran to a concentration of 1%, and 10 μl of the dissolved sample is injected into a gel permeation chromatograph (GPC) at a flow rate of 0.3 mL/min. At this time, analysis is performed at a sample concentration of 2.0 mg/mL (100 μl injection) at 30 In this case, two columns (PLmixed B, Waters Co.) are connected in series, and an RI detector (2414, Agilent Waters Co.) is used. At this time, measurement is performed at 40° C., and data is processed using ChemStation.

Based on a total weight of all components (the polyester resin, the recycled resin, the conjugated diene-aromatic vinyl compound-vinyl cyanide compound graft copolymer, the conjugated diene-aromatic vinyl compound-vinyl cyanide compound bulk copolymer, the copolymer composed of an acrylate-based compound-alkyl-substituted aromatic vinyl compound-vinyl cyanide compound, the maleimide-based polymer, and the additives) constituting the thermoplastic resin composition, the copolymer composed of an acrylate-based compound-alkyl-substituted aromatic vinyl compound-vinyl cyanide compound may be included in an amount of 27 to 45% by weight, preferably 28 to 40% by weight, more preferably 29 to 35% by weight. When the copolymer composed of an acrylate-based compound-alkyl-substituted aromatic vinyl compound-vinyl cyanide compound is included in an amount satisfying the above range, a thermoplastic resin composition having excellent balance between chemical resistance, mechanical properties, and heat resistance may be obtained.

Maleimide-Based Polymer

In one embodiment of the present disclosure, the maleimide-based polymer may improve the physical property balance of the thermoplastic resin compositions. That is, the maleimide-based polymer may act as a base resin to control surface impact, mechanical properties, processability, coating appearance, and prevention of cracking after coating.

For example, based on a total weight of all components constituting the maleimide-based polymer, the maleimide-based polymer may include 20% by weight or more, preferably 20 to 80% by weight, more preferably 30 to 60% by weight, still more preferably 40 to 60% by weight, still more preferably 45 to 55% by weight of a maleimide-based monomer. Within this range, mechanical properties and heat resistance may be excellent.

The maleimide-based polymer may be preferably a copolymer including N-(substituted) maleimide and an aromatic vinyl compound, more preferably a copolymer including N-(substituted) maleimide; unsaturated dicarboxylic acid or an anhydride thereof; and an aromatic vinyl compound. Within this range, mechanical properties and heat resistance may be excellent.

When the maleimide-based polymer is prepared, a maleimide-based compound, an aromatic vinyl compound, and maleic acid or an anhydride thereof may be fed batchwise or continuously, and may be polymerized using one or more methods selected from emulsion polymerization, suspension polymerization, and bulk polymerization.

Specifically, the maleimide-based polymer may include 45 to 55% by weight of a maleimide-based compound, 40 to 50% by weight of an aromatic vinyl compound, and 1 to 10% by weight of maleic acid or an anhydride thereof. Within this range, mechanical properties and heat resistance may be excellent.

The maleimide-based compound is preferably maleimide and/or N-(substituted) maleimide, more preferably N-(substituted) maleimide, and as a specific example, may include one or more selected from the group consisting of N-methylmaleimide, N-ethylmaleimide, N-cyclohexylmaleimide, and N-phenylmaleimide. Within range, mechanical properties and heat resistance may be excellent.

For example, based on 100% by weight in total of all components constituting the maleimide-based polymer, the maleimide-based compound may be included in an amount of 26 to 34% by weight, preferably 26 to 32% by weight, more preferably 26 to 30% by weight. Within this range, the heat resistance at high temperatures, injection moldability, and surface gloss of a molded article manufactured using the thermoplastic resin composition of the present disclosure may be further improved.

The type of the aromatic vinyl compound is as described in the conjugated diene-aromatic vinyl compound-vinyl cyanide compound graft copolymer.

For example, based on 100% by weight in total of all components constituting the maleimide-based polymer, the maleimide-based polymer may include the aromatic vinyl compound in an amount of 66 to 76% by weight, preferably 68 to 74% by weight, more preferably 70 to 74% by weight. Within this range, the mechanical properties and heat resistance of a molded article manufactured using the thermoplastic resin composition of the present disclosure may be excellent.

For example, based on 100% by weight in total of all components constituting the maleimide-based polymer, the maleic acid or the anhydride thereof may be included in an amount of 1 to 10% by weight, preferably 1 to 8% by weight, more preferably 2 to 8% by weight. Within this range, the heat resistance at high temperatures, injection moldability, and surface gloss of a molded article including the above-described maleimide-based polymer may be further improved.

For example, the maleimide-based polymer may have a weight average molecular weight of 40,000 to 200,000 g/mol, preferably 60,000 to 190,000 g/mol, more preferably 80,000 to 190,000 g/mol. Within this range, the physical property balance of the base resin may be improved. That is, the balance between mechanical properties, processability, and coating appearance may be easily controlled.

In the present disclosure, weight average molecular weight may be measured using tetrahydrofuran (THF) as an eluate through gel permeation chromatography (GPC, Waters Breeze). In this case, weight average molecular weight is obtained as a relative value to a polystyrene (PS) standard sample. Specifically, the weight average molecular weight is a weight average molecular weight (Mw) converted based on polystyrene by gel permeation chromatography (GPC, PL GPC220, Agilent Technologies).

Specifically, a polymer to be measured is dissolved in tetrahydrofuran to a concentration of 1%, and 10 μl of the dissolved sample is injected into a gel permeation chromatograph (GPC) at a flow rate of 0.3 mL/min. At this time, analysis is performed at a sample concentration of 2.0 mg/mL (100 μl injection) at 30° C. In this case, two columns (PLmixed B, Waters Co.) are connected in series, and an RI detector (2414, Agilent Waters Co.) is used. At this time, measurement is performed at 40° C., and data is processed using ChemStation.

A commercially available product may be used as the maleimide-based polymer as long as the product meets the definition of the maleimide-based polymer of the present disclosure.

Based on a total weight of all components (the polyester resin, the recycled resin, the conjugated diene-aromatic vinyl compound-vinyl cyanide compound graft copolymer, the conjugated diene-aromatic vinyl compound-vinyl cyanide compound bulk copolymer, the copolymer composed of an acrylate-based compound-alkyl-substituted aromatic vinyl compound-vinyl cyanide compound, the maleimide-based polymer, and the additives) constituting the thermoplastic resin composition, the maleimide-based polymer may be included in an amount of 8 to 12.5% by weight, preferably 9 to 12% by weight, more preferably 10 to 11% by weight. When the maleimide-based polymer is included in an amount satisfying the above range, a thermoplastic resin composition having excellent balance between chemical resistance, mechanical properties, and heat resistance may be obtained.

Thermoplastic Resin Composition

In one embodiment of the present disclosure, the thermoplastic resin composition may include one or more additives selected from an antioxidant, lubricant, a hydrolysis suppressor, a flame retardant, a nucleating agent, a heat stabilizer, a light stabilizer, and a thickener.

For example, the antioxidant may include a phenol-based antioxidant, a phosphorus-based antioxidant, or both. In this case, oxidation by heat may be prevented during an extrusion process, and mechanical properties may be excellent.

The lubricant according to the present disclosure may be lignite-derived mineral wax or olefin-based wax. In this case, the releasability and injection properties of the thermoplastic resin composition may be maintained at an excellent level.

The olefin-based wax may be a polymer having a low melt viscosity and may be an oily solid having sliding properties and plasticity. For example, the olefin-based wax may include at least one selected from polyethylene wax and polypropylene wax, and commercially available olefin wax may be used.

The mineral wax has a high melting point, high hardness, and high stability, and one or more selected from OP and E grade mineral wax may be used. In addition, a commercially available product may be used as the mineral was as long as the product meets the definition of the mineral wax of the present disclosure.

Various known hydrolysis suppressors may be used as the hydrolysis suppressor according to the present disclosure within the range that does not adversely affect the thermoplastic resin composition of the present disclosure. Representative commercially available hydrolysis suppressors include inorganic phosphate compounds such as sodium phosphate monobasic represented by Chemical Formula of $NaH_2PO_4$.

Various known nucleating agents may be used as the nucleating agent according to the present disclosure within the range that does not adversely affect the thermoplastic resin composition of the present disclosure. Representative commercially available nucleating agents include BRUGGOLEN_P22.

Various known flame retardants may be used as the flame retardant according to the present disclosure within the range that does not adversely affect the thermoplastic resin composition of the present disclosure. Representative commercially available flame retardants include Clariant_Exolit-OP-1230.

Various known thickeners may be used as the thickener according to the present disclosure within the range that does not adversely affect the thermoplastic resin composition of the present disclosure. Representative commercially available thickeners include Xibond250.

In one embodiment of the present disclosure, for example, based on 100 parts by weight in total of all components (the polyester resin, the recycled resin, the conjugated diene-aromatic vinyl compound-vinyl cyanide compound graft copolymer, the conjugated diene-aromatic vinyl compound-vinyl cyanide compound bulk copolymer, the copolymer composed of an acrylate-based compound-alkyl-substituted aromatic vinyl compound-vinyl cyanide compound, the maleimide-based polymer, and the additives) constituting the thermoplastic resin composition, the additives may be included in an amount of 0.01 to 5 parts by weight, preferably 0.05 to 3 parts by weight, more preferably 0.01 to 2 parts by weight. Within this range, excellent releasability and injection properties may be achieved.

In addition, processing aids, pigments, colorants, and the like may be further included as needed.

As a specific example, when the thermoplastic resin composition includes 12.7 to 20% by weight of the polyester resin, 1 to 12% by weight of the recycled resin or the polyamide/polyalkylene terephthalate alloy resin, greater than 15% by weight and 18% by weight or less of the conjugated diene-aromatic vinyl compound-vinyl cyanide compound graft copolymer, greater than 15% by weight and 22% by weight or less of the conjugated diene-aromatic vinyl compound-vinyl cyanide compound bulk copolymer, 27 to 45% by weight of the copolymer composed of an acrylate-based compound-alkyl-substituted aromatic vinyl compound-vinyl cyanide compound, 8 to 12.5% by weight of the maleimide-based polymer, and 0.1 to 5% by weight of the additives, which are described above, and the recycled resin is a black chip obtained by desalting a waste fishing nets having a size of 2 km×80 m and is an extruded product obtained by desalting and chip-molding waste fishing net pellets including 60 to 99.9% by weight in total of Ca, Fe, and S and 0.1 to 40% by weight in total of Na, Mg, Al, Si, K, Ti, Ni, Zn, Sb, and Cl based on 100% by weight in total of inorganic components as measured using ICP-OES equipment, the thermoplastic resin composition may have tensile strength, elongation, and flexural strength equal or superior to those of a conventional polyester composite material, may have greatly improved impact strength, flexural modulus, and heat deflection temperature under high load, and thus may be used as a material suitable for manufacturing lightweight automotive parts having high rigidity.

In one embodiment of the present disclosure, the thermoplastic resin composition may have a flexural modulus of 2,100 MPa or more, as a specific example, 2,100 to 2,150 MPa, as measured at a span of 64 and a rate of 2 mm/min according to standard measurement ISO 178. Within this range, molding characteristics required for injection products with high rigidity may be secured.

For example, the thermoplastic resin composition according to the present disclosure may have a room-temperature impact strength of 9.3 KJ/m$^2$ or more, as a specific example, 9.3 to 12 kJ/m$^2$, as measured according to standard measurement ISO 180/1A. Within this range, impact strength and appearance required for injection products with high rigidity may be secured.

In one embodiment of the present disclosure, for example, the thermoplastic resin composition may have a heat deflection temperature of 86° C. or higher, as a specific example, 88 to 90 kJ/m$^2$, as measured under a high load of 1.80 MPa according to standard measurement ISO 75. Within this range, high-load heat resistance characteristics required for high rigidity may be secured.

The thermoplastic resin composition may have a room-temperature tensile strength of 47 MPa or more, as a specific example, 47 to 52 MPa, as measured at a rate of 50 mm/min according to standard measurement ISO 527. In this case, mechanical properties, particularly rigidity and processability, may be excellent.

The thermoplastic resin composition may have a melt flow index (260° C., 5 kg) of 10.0 g/10 min or more, as a specific example, 10.0 to 12.0 g/10 min, as measured according to standard measurement ISO 1133. In this case, processability may be excellent.

As a specific example, when the thermoplastic resin composition includes 12.7 to 20% by weight of the polyester resin, 1 to 12% by weight of the recycled resin or the polyamide/polyalkylene terephthalate alloy resin, greater than 15% by weight and 18% by weight or less of the conjugated diene-aromatic vinyl compound-vinyl cyanide compound graft copolymer, greater than 15% by weight and 22% by weight or less of the conjugated diene-aromatic vinyl compound-vinyl cyanide compound bulk copolymer, 27 to 45% by weight of the copolymer composed of an acrylate-based compound-alkyl-substituted aromatic vinyl compound-vinyl cyanide compound, 8 to 12.5% by weight of the maleimide-based polymer, and 0.01 to 5% by weight of the additives, which are described above, and is an extruded product of a thermoplastic resin composition having a heat deflection temperature of 86° ° C. or higher as measured under 1.80 MPa according to standard measurement ISO 75, the thermoplastic resin composition may have tensile strength, elongation, and flexural strength equal or superior to those of a conventional polyester composite material, may have greatly improved impact strength, flexural modulus, and heat deflection temperature under high load, and thus may be used as a material suitable for manufacturing lightweight automotive parts having high rigidity.

In addition, when the thermoplastic resin composition includes 12.7 to 20% by weight of the polyester resin, 1 to 12% by weight of the recycled resin or the polyamide/polyalkylene terephthalate alloy resin, greater than 15% by weight and 18% by weight or less of the conjugated diene-aromatic vinyl compound-vinyl cyanide compound graft copolymer, greater than 15% by weight and 22% by weight or less of the conjugated diene-aromatic vinyl compound-vinyl cyanide compound bulk copolymer, 27 to 45% by weight of the copolymer composed of an acrylate-based compound-alkyl-substituted aromatic vinyl compound-vinyl cyanide compound, 8 to 12.5% by weight of the maleimide-based polymer, and 0.1 to 5% by weight of the additives, which are described above, and the recycled resin is a black chip obtained by desalting waste fishing nets having a size of 2 km×80 m and is an extruded product obtained by desalting and chip-molding waste fishing net pellets containing 60 to 99.9% by weight in total of Ca, Fe, and S and 0.1 to 40% by weight in total of Na, Mg, Al, Si, K, Ti, Ni, Zn, Sb, and Cl based on 100% by weight in total of inorganic components as measured using ICP-OES equipment, the thermoplastic resin composition may have tensile strength, elongation, and flexural strength equal or superior to those of a conventional polyester composite material, may have greatly improved impact strength, flexural modulus, and heat deflection temperature under high load, and thus may be used as a material suitable for manufacturing lightweight automotive parts having high rigidity.

Method of Preparing Thermoplastic Resin Composition

The thermoplastic resin composition according to the present disclosure may be prepared by a method known in the art. For example, the thermoplastic resin composition may be prepared in the form of pellets by a method of melt-extruding a mixture of components and additives using an extruder, and the pellets may be used to manufacture injection-molded articles and extrusion-molded articles.

The method of preparing the thermoplastic resin composition shares all the technical characteristics of the above-described thermoplastic resin composition. Accordingly, repeated description thereof will be omitted.

In one embodiment of the present disclosure, the pellets are extruded at a temperature of 230 to 250° C. At this time, the temperature means cylinder temperature.

Extrusion kneaders commonly used in the art to which the present disclosure pertains may be used without particular limitation, and a twin-screw extrusion kneader is preferably used.

During injection, mold temperature is 60 to 120° C., preferably 80 to 100° C. When the mold temperature is less than 60° C., appearance may be deteriorated, and the effect of increasing crystallinity and physical properties due to annealing may be insignificant. When the mold temperature exceeds 120° C., pellets may stick to a mold, reducing releasability and increasing a cooling rate. In addition, productivity may be greatly reduced in terms of mass production.

For example, the injection process may be performed using an injection machine with hopper temperature and nozzle temperature set to 230° C. to 260° C., respectively.

For example, the method of preparing the thermoplastic resin composition of the present disclosure includes a step of desalting waste fishing nets to obtain black polyamide-polyethylene terephthalate chips; and a step of melt-kneading and extruding a resin composition including a base resin including the polyamide-polyethylene terephthalate and the polybutylene terephthalate, a reinforcing resin, glass fiber, and additives.

According to one embodiment of the present disclosure, the method of preparing the thermoplastic resin composition may include a step of desalting waste polyester fishing nets having an intrinsic viscosity (IV) of 0.6 to 0.9 dl/g to obtain waste fishing net pellets and chip-molding the waste fishing net pellets to prepare a recycled resin containing 60 to 99.9% by weight in total of Ca, Fe, and S and 0.1 to 40% by weight in total of Na, Mg, Al, Si, K, Ti, Ni, Zn, Sb, and Cl based on 100% by weight in total of inorganic components as measured using ICP-OES equipment; and a step of melt-kneading and extruding 1 to 12% by weight of the recycled resin, 12.7 to 20% by weight of a polyester resin, greater than 15% by weight and 18% by weight or less of a conjugated diene-aromatic vinyl compound-vinyl cyanide compound graft copolymer, greater than 15% by weight and 22% by weight or less of a conjugated diene-aromatic vinyl compound-vinyl cyanide compound bulk copolymer, 27 to 45% by weight of a copolymer composed of an acrylate-based compound-alkyl-substituted aromatic vinyl compound-vinyl cyanide compound, 8 to 12.5% by weight of a maleimide-based polymer, and 0.1 to 5% by weight of additives.

As a specific example, the method of preparing the thermoplastic resin composition may include a step of desalting waste polyester fishing nets having an intrinsic viscosity (IV) of 0.6 to 0.9 dl/g to obtain waste fishing net pellets and chip-molding the waste fishing net pellets to prepare a recycled resin containing 60 to 99.9% by weight in total of Ca, Fe, and S and 0.1 to 40% by weight in total of Na, Mg, Al, Si, K, Ti, Ni, Zn, Sb, and Cl based on 100% by weight in total of inorganic components as measured using ICP-OES equipment; and a step of melt-kneading and extruding the recycled resin, a polyester resin having an intrinsic viscosity (IV) of less than 1.0 dl/g, a reinforcing resin, and a filling fiber.

<Molded Article>

The thermoplastic resin composition of the present disclosure may be used as a material for molded articles requiring excellent moldability and heat resistance and high rigidity and toughness.

The thermoplastic resin composition of the present disclosure may be used to manufacture lightweight parts requiring high rigidity and toughness. For example, in addition to automotive parts, the thermoplastic resin composition may be used to manufacture electrical/electronic parts and parts for office equipment.

According to another embodiment of the present disclosure, a molded article manufactured using the above-described thermoplastic resin composition is provided.

For example, the molded article may be a lightweight automotive part having high heat resistance and rigidity.

As another example, the molded article may be a lightweight automotive part requiring high rigidity and high-load heat resistance, such as a center fascia and a door trim.

For example, the molded article may have a room-temperature impact strength of 9.3 KJ/m$^2$ or more, preferably 9.3 to 12 kJ/m as measured according to standard measurement ISO 180/1A.

In addition, for example, the molded article may have a heat deflection temperature of 86° C. or higher, preferably 88 to 90° C. as measured under 1.80 MPa according to standard measurement ISO 75.

In addition, for example, the molded article may have a flexural modulus of 2,100 MPa or more, preferably 2,100 to 2,150 MPa as measured at a span of 64 and a rate of 2 mm/min according to standard measurement ISO 178.

Accordingly, the thermoplastic resin composition of the present disclosure may be used as a material for molded articles requiring excellent moldability and heat resistance and high rigidity and toughness.

The thermoplastic resin composition of the present disclosure may be used to manufacture lightweight parts requiring high rigidity and toughness. For example, in addition to automotive parts, the thermoplastic resin composition may be used to manufacture electrical/electronic parts and parts for office equipment.

In describing the thermoplastic resin composition and the molded article, it should be noted that other conditions or equipment not explicitly described herein may be appropriately selected within the range commonly practiced in the art without particular limitation.

Hereinafter, embodiments of the present disclosure are described in detail so as for those of ordinary skill in the art to easily implement the present disclosure. However, the present disclosure may be implemented in various different forms and is not limited to these embodiments.

EXAMPLES

Components used in Examples of the present disclosure and Comparative Examples are as follows.

(A) Polybutylene terephthalate (A-1) PBT having an intrinsic viscosity of 1.2 dl/g (A-2) PBT having an intrinsic viscosity of 0.8 dl/g (B) Waste fishing net chips: Black chips of FIG. 2C obtained by processing waste fishing nets according to the flowchart of FIG. 1

(C) Conjugated diene-aromatic vinyl compound-vinyl cyanide compound graft copolymer: An emulsion polymer (Mw: 78,000 g/mol) including 60% by weight of a butadiene polymer having an average particle diameter of 300 nm, 30% by weight of styrene, and 10% by weight of acrylonitrile (D) Conjugated diene-aromatic vinyl compound-vinyl cyanide compound bulk copolymer: A bulk polymer (Mw: 130,000 to 180,000 g/mol) including 60% by weight of a butadiene polymer having an average particle diameter of 300 nm, 30% by weight of styrene, and 10% by weight of acrylonitrile (E) Copolymer composed of an acrylate-based compound-alkyl-substituted aromatic vinyl compound-vinyl cyanide compound (Butyl acrylate polymer: 50% by weight, α-methyl styrene: 35% by weight, acrylonitrile: 15% by weight, Mw: 100,000 g/mol)

(F) Copolymer composed of a styrene-vinyl cyanide compound (Styrene: 72% by weight, acrylonitrile: 28% by weight, Mw: 130,000 g/mol)

(G) Maleimide-based polymer (Phenylmaleimide: 52% by weight, maleic anhydride: 2% by weight, styrene: 46% by weight, Mw: 130,000 g/mol)

Antioxidant (phenol-based antioxidant): Pentaerythritol tetrakis(3-(3,5-di-tert-butyl-4-hydroxyphenyl) propionate)

Nucleating agent: Polyethylene wax (LDPE wax)

Hydrolysis suppressor (transesterification inhibitor): Sodium phosphate monobasic represented by Chemical Formula of $NaH_2PO_4$ Examples 1 to 4 and Comparative Examples 1 to 10

Each component was added according to the contents described in Table 2 below and melt-kneaded using a twin-screw extruder heated to 230 to 250° ° C. to prepare a resin composition in pellet form. For reference, the antioxidant was added in an amount of 0.5% by weight, the nucleating agent was added in an amount of 0.5% by weight, and the hydrolysis suppressor was added in an amount of 0.35% by weight.

After drying the obtained pellets at 80° C. for more than 4 hours, the dried pellets were injected at a mold temperature of 80° C., a hopper temperature of 230° ° C. to 250° C., and a nozzle temperature of 230° ° C. to 250° C. using a screw-type injection machine to obtain a specimen for evaluating mechanical properties. For the prepared specimen having a thickness of 4 mm, a width of 10 mm, and a marked line section (elongation measurement) of 50 mm, the physical properties thereof were measured in the following manners, and the results are shown in Table 3 below.

Melt flow index (Unit: g/10 min): Melt flow index was measured at 260° C. under a load of 2.16 kg according to ISO 1133.

Impact strength (Unit: $KJ/m^2$): Impact strength was measured according to ISO 180/1A (Notched, room temperature of 23° C.).

Tensile strength (Unit: MPa) and elongation (Unit: %): Tensile strength and elongation were measured at a room temperature of 23° C. and a rate of 50 mm/min according to ISO 527.

Flexural strength (Unit: MPa) and flexural modulus (Unit: MPa): Flexural strength and flexural modulus were measured at a span of 64 and a rate of 2 mm/min according to ISO 178.

Heat deflection temperature (Unit: ° C.): Heat deflection temperature was measured under a high load of 1.80 MPa according to ISO 75.

Density (Unit: $g/cm^3$): Density was measured according to ISO 1183.

TABLE 2

| Classificati | Example 1 | Example 2 | Example 3 | Example 4 | Comparative Example 1 | Comparative Example 2 | Comparative Example 3 | Comparative Example 4 |
|---|---|---|---|---|---|---|---|---|
| A-1 | 18.15 | 14.65 | 14.65 | 14.65 | 14.65 | 14.65 | 14.65 | 14.65 |
| A-2 | — | — | — | — | — | — | — | — |
| B | 5 | 10 | 10 | 10 | 10 | 10 | 10 | 10 |
| C | 16 | 16 | 17 | 18 | 10 | 15 | 20 | — |
| D | 17 | 17 | 16 | 17 | 20 | 15 | 10 | 25 |
| E | 32.5 | 31 | 30 | 29 | 44 | 44 | 44 | 44 |
| F | — | — | — | — | — | — | — | — |
| G | 10 | 10 | 11 | 10 | — | — | — | 5 |

| Classificati | Comparative Example 5 | Comparative Example 6 | Comparative Example 7 | Comparative Example 8 | Comparative Example 9 | Comparative Example 10 |
|---|---|---|---|---|---|---|
| A-1 | 14.65 | 14.65 | 15.65 | 10.65 | 18.15 | — |
| A-2 | — | — | — | — | — | 18.15 |
| B | 10 | 10 | 15 | 20 | 5 | 5 |
| C | — | 25 | — | — | 16 | 16 |
| D | 20 | 5 | 29 | 29 | 17 | 17 |
| E | 40 | 44 | 23.5 | 23.5 | — | 32.5 |
| F | — | — | — | — | 42.5 | — |
| G | 14 | — | 15.5 | 15.5 | — | 10 |

TABLE 3

| Classification | Example 1 | Example 2 | Example 3 | Example 4 | Comparative Example 1 | Comparative Example 2 | Comparative Example 3 | Comparative Example 4 |
|---|---|---|---|---|---|---|---|---|
| Melt flow index | 16 | 18 | 17 | 16 | 16 | 18 | 17 | Not extruded |
| Impact strength | 12 | 9.3 | 10.1 | 10.2 | 6.5 | 8.5 | 11.3 | Not extruded |
| Tensile strength | 52 | 47 | 47 | 47 | 50 | 48 | 43 | Not extruded |
| Flexural strength | 66 | 67 | 68 | 68 | 72 | 68 | 62 | Not extruded |
| Flexural modulus | 2100 | 2130 | 2110 | 2150 | 2260 | 2140 | 1950 | Not extruded |
| HDT | 90 | 89 | 88 | 88 | 84 | 86 | 84 | Not extruded |

TABLE 3-continued

| Classification | Comparative Example 5 | Comparative Example 6 | Comparative Example 7 | Comparative Example 8 | Comparative Example 9 | Comparative Example 10 |
|---|---|---|---|---|---|---|
| Melt flow index | 25 | 13 | 23 | 25 | 25 | 20 |
| Impact strength | 2.4 | 14.7 | 7.2 | 6.2 | 12.3 | 8.0 |
| Tensile strength | 54 | 40 | 39 | 39 | 49 | 52 |
| Flexural strength | 96 | 60 | 57 | 57 | 60 | 66 |
| Flexural modulus | 2750 | 1810 | 1990 | 2000 | 1900 | 2100 |
| HDT | 96 | 84 | 85 | 83 | 80 | 88 |

As shown in Tables 2 and 3, in the case of Examples 1 to 4 using polybutylene terephthalate and a recycled resin obtained by desalting waste fishing nets, which are essential components, and including a conjugated diene-aromatic vinyl compound-vinyl cyanide compound graft copolymer, a conjugated diene-aromatic vinyl compound-vinyl cyanide compound bulk copolymer, a copolymer composed of an acrylate-based compound-alkyl-substituted aromatic vinyl compound-vinyl cyanide compound, and a maleimide-based polymer in a predetermined content ratio, melt flow index is 16 to 18 g/10 min, IZOD impact strength is 9.2 to 12 kJ/$m^2$ or more, tensile strength is 47 to 52 MPa, flexural strength is 161 MPa or more, flexural modulus is 8,000 MPa or more, and heat deflection temperature is 80° C. or higher. Based on these results, it can be confirmed that Examples 1 to 4 have good physical property balance between high rigidity, high-load heat resistance, and specific gravity.

On the other hand, in the case of Comparative Example 1 including an inappropriate amount of polybutylene terephthalate constituting the base resin, heat deflection temperature and impact strength are reduced.

In addition, in the case of Comparative Examples 2 and 3 including an inappropriate amount of the conjugated diene-aromatic vinyl compound-vinyl cyanide compound bulk copolymer, tensile strength and heat deflection temperature are reduced.

In addition, in the case of Comparative Example 4 that does not include the conjugated diene-aromatic vinyl compound-vinyl cyanide compound graft copolymer, manufacture of an extruded product was not possible. In the case of Comparative Example 5 in which the amount of the conjugated diene-aromatic vinyl compound-vinyl cyanide compound bulk copolymer is reduced and the amount of the copolymer composed of an acrylate-based compound-alkyl-substituted aromatic vinyl compound-vinyl cyanide compound is increased compared to Comparative Example 4, impact strength is reduced.

In addition, in the case of Comparative Example 6 that does not include the maleimide-based polymer, tensile strength, flexural strength, and heat deflection temperature are reduced.

In addition, in the case of Comparative Examples 7 and 8 that do not include the conjugated diene-aromatic vinyl compound-vinyl cyanide compound graft copolymer and include an excess of the maleimide-based polymer, impact strength, tensile strength, flexural strength, and heat deflection temperature are reduced.

In addition, in the case of Comparative Example 9 including a copolymer composed of a styrene-vinyl cyanide compound instead of the copolymer composed of an acrylate-based compound-alkyl-substituted aromatic vinyl compound-vinyl cyanide compound and the maleimide-based polymer of Example 1, flexural strength, flexural modulus, and heat deflection temperature are reduced, and melt flow index is poor.

In addition, in the case of Comparative Example 10 in which the intrinsic viscosity of polybutylene terephthalate is outside the appropriate range, compared to Example 1, impact strength and melt flow index are adversely affected.

In conclusion, when the recycled resin satisfying the specific physical properties described in the present disclosure, the polyester resin, the conjugated diene-aromatic vinyl compound-vinyl cyanide compound graft copolymer, the conjugated diene-aromatic vinyl compound-vinyl cyanide compound bulk copolymer, the copolymer composed of an acrylate-based compound-alkyl-substituted aromatic vinyl compound-vinyl cyanide compound, and the maleimide-based polymer are included in an appropriate composition ratio, compared to a thermoplastic resin composition including a conventional polyester composite material including fresh polyethylene terephthalate instead of a recycled resin or a polyamide/polyalkylene terephthalate alloy resin, high heat resistance and high rigidity may be obtained while satisfying eco-friendliness.

The invention claimed is:

1. A thermoplastic resin composition, comprising:
12.7 to 20% by weight of a polyester resin;
1 to 12% by weight of a recycled resin or a polyamide/polyalkylene terephthalate alloy resin;
greater than 15% by weight and 18% by weight or less of a conjugated diene-aromatic vinyl compound-vinyl cyanide compound graft copolymer;
greater than 15% by weight and 22% by weight or less of a conjugated diene-aromatic vinyl compound-vinyl cyanide compound bulk copolymer;
27 to 45% by weight of a copolymer composed of an acrylate-based compound-alkyl-substituted aromatic vinyl compound-vinyl cyanide compound; and
8 to 12.5% by weight of a maleimide-based polymer.

2. The thermoplastic resin composition according to claim 1, wherein the recycled resin is a resin obtained by processing waste fishing nets.

3. The thermoplastic resin composition according to claim 2, wherein the resin obtained by processing waste fishing nets comprises 60 to 99.9% by weight in total of Ca, Fe, and S, and 0.1 to 40% by weight in total of Na, Mg, Al, Si, K, Ti, Ni, Zn, Sb, and Cl, based on 100% by weight of total inorganic components as measured using Inductively Coupled Plasma Optical Emission spectroscopy (ICP-OES) equipment.

4. The thermoplastic resin composition according to claim 2, wherein the resin obtained by processing waste fishing nets is a desalted recycled resin.

5. The thermoplastic resin composition according to claim 1, wherein the polyester resin has polybutylene terephthalate having an intrinsic viscosity (IV) of 1.0 dl/g or more.

6. The thermoplastic resin composition according to claim 1, wherein the conjugated diene-aromatic vinyl compound-vinyl cyanide compound graft copolymer is a graft copolymer comprising 40 to 80% by weight of conjugated diene rubber having an average particle diameter of 100 to 500 nm, 10 to 40% by weight of an aromatic vinyl compound, and 1 to 20% by weight of a vinyl cyanide compound.

7. The thermoplastic resin composition according to claim 1, wherein the conjugated diene-aromatic vinyl compound-vinyl cyanide compound bulk copolymer is a bulk copolymer comprising 5 to 20% by weight of conjugated diene rubber having an average particle diameter of 800 to 10,000 nm, 50 to 85% by weight of an aromatic vinyl compound, and 10 to 30% by weight of a vinyl cyanide compound.

8. The thermoplastic resin composition according to claim 1, wherein the copolymer composed of an acrylate-based compound-alkyl-substituted aromatic vinyl compound-vinyl cyanide compound is a copolymer comprising 40 to 60% by weight of an acrylate-based compound, 30 to 40% by weight of an alkyl-substituted aromatic vinyl compound, and 1 to 20% by weight of a vinyl cyanide compound.

9. The thermoplastic resin composition according to claim 1, wherein the maleimide-based polymer comprises 45 to 55% by weight of a maleimide-based compound, 40 to 50% by weight of an aromatic vinyl compound, and 1 to 10% by weight of maleic acid or an anhydride thereof.

10. The thermoplastic resin composition according to claim 1, wherein the thermoplastic resin composition further comprises:

0.1 to 5% by weight of one or more additives selected from the group consisting of an antioxidant, a lubricant, a hydrolysis suppressor, a flame retardant, a nucleating agent, a heat stabilizer, a light stabilizer, and a thickener.

11. The thermoplastic resin composition according to claim 1, wherein the thermoplastic resin composition has a room-temperature impact strength of 9.3 kJ/$m^2$ or more as measured according to standard measurement ISO 180/1A.

12. The thermoplastic resin composition according to claim 1, wherein the thermoplastic resin composition has a heat deflection temperature of 86° C. or higher as measured under 1.80 MPa according to standard measurement ISO 75.

13. A method of preparing a thermoplastic resin composition, comprising:

desalting waste polyester fishing nets having an intrinsic viscosity (IV) of 0.6 to 0.9 dl/g to obtain waste fishing net pellets and chip-molding the waste fishing net pellets to prepare a recycled resin containing 60 to 99.9% by weight in total of Ca, Fe, and S and 0.1 to 40% by weight in total of Na, Mg, Al, Si, K, Ti, Ni, Zn, Sb, and Cl, based on 100% by weight of total inorganic components as measured using Inductively Coupled Plasma Optical Emission spectroscopy (ICP-OES) equipment; and melt-kneading and extruding 1 to 12% by weight of the recycled resin, 12.7 to 20% by weight of a polyester resin, greater than 15% by weight and 18% by weight or less of a conjugated diene-aromatic vinyl compound-vinyl cyanide compound graft copolymer, greater than 15% by weight and 22% by weight or less of a conjugated diene-aromatic vinyl compound-vinyl cyanide compound bulk copolymer, 27 to 45% by weight of a copolymer composed of an acrylate-based compound-alkyl-substituted aromatic vinyl compound-vinyl cyanide compound, 8 to 12.5% by weight of a maleimide-based polymer, and 0.1 to 5% by weight of additives, wherein the thermoplastic resin composition has a heat deflection temperature of 86° C. or higher as measured under 1.80 MPa according to standard measurement ISO 75.

14. A molded article manufactured using the thermoplastic resin composition according to claim 1.

15. The molded article according to claim 14, wherein the molded article is an automotive part.

* * * * *